US012674575B1

(12) United States Patent
Fitts

(10) Patent No.: US 12,674,575 B1
(45) Date of Patent: Jul. 7, 2026

(54) CANDLE HOLDER STRUCTURE

(71) Applicant: Cliffie L. Fitts, Yulee, FL (US)

(72) Inventor: Cliffie L. Fitts, Yulee, FL (US)

( * ) Notice: Subject to any disclaimer, the term of this patent is extended or adjusted under 35 U.S.C. 154(b) by 379 days.

(21) Appl. No.: 18/508,725

(22) Filed: Nov. 14, 2023

Related U.S. Application Data

(60) Provisional application No. 63/479,781, filed on Jan. 13, 2023.

(51) Int. Cl.
*F21V 35/00* (2006.01)

(52) U.S. Cl.
CPC .................................... *F21V 35/00* (2013.01)

(58) Field of Classification Search
CPC ....................................................... F21V 35/00
See application file for complete search history.

(56) References Cited

U.S. PATENT DOCUMENTS 347,873 A * 8/1886 Gehnrich ................ F21V 35/00 431/295
429,471 A * 6/1890 McGovern .............. F21V 35/00 431/295
716,484 A * 12/1902 Ryan ....................... F21V 35/00 431/295
737,157 A * 8/1903 Schroeder ............... F21V 35/00 431/294
5,975,889 A 11/1999 Culpepper
D427,338 S 6/2000 Ratia
6,702,573 B2 3/2004 Massey
7,021,927 B1 * 4/2006 Gryzlak .................. F21V 35/00 431/295
2010/0104994 A1 * 4/2010 Fuqua ..................... F21V 21/06 431/297

FOREIGN PATENT DOCUMENTS

DE 10122290 A1 * 11/2002 .............. F21V 35/00

* cited by examiner

*Primary Examiner* — Alfred Basichas
(74) *Attorney, Agent, or Firm* — Sanchelima & Associates, P.A.; Christian Sanchelima; Jesus Sanchelima

(57) ABSTRACT

A candle holder structure including a body assembly with a central rod attached to a base and multiple adjustable holder assemblies stacked along the central rod. Each holder assembly has a central holder linked by rods to multiple candle holders arranged circularly around the central holder. The candle holders have open tops to receive candles. The body assembly includes a lampshade on the central rod to diffuse light and a power cord with a foot switch. Covers enclose the candle holders and can exhibit patterns matching the lampshade. A stopper in the central holder secures it to the central rod. The stacked and holder assembly design provides a configurable candle display. The foot switch, patterned covers, and stopper represent novel features not disclosed in prior art.

10 Claims, 3 Drawing Sheets

CANDLE HOLDER STRUCTURE

OTHER RELATED APPLICATIONS

The present application is U.S. Non-Provisional Patent application claiming priority of U.S. Provisional Patent Application No. 63/479,78, filed on Nov. 22, 2022, which is hereby incorporated by reference.

BACKGROUND OF THE INVENTION

Field of the Invention

The present invention relates to candle holders and, more particularly, to a candle holder structure that includes a candle holder structure with a body assembly including a central rod attached to a base, and a holder assembly including a central holder, candle holders, and holder rods linking the central holder to the candle holders. Multiple holder assemblies are disposed along the central rod.

Description of the Related Art

Several designs for candle holders have been designed in the past. None of them, however, include a combination of a candle holder and a foot lamp that features a structural composition comprising a body assembly and a holder assembly. The body assembly consists of a central rod affixed to a base. The holder assembly incorporates a central holder, candle holders, and holder rods connecting the central holder to the candle holders. Numerous holder assemblies are arranged along the central rod.

Applicant believes that a related reference corresponds to U.S. Pat. No. 6,702,573 issued for a Candle support method and apparatus. The “573” reference, discloses a method and apparatus for supporting and controlling a candle in an candelabra and other candle holders is disclosed. A candle support apparatus includes an outer shell or tubular body and inner shell or tubular body. The outer shell is typically a rigid casing that attaches to the candelabra or other candle holder. The inner radius of the outer shell is typically larger than the candle. The inner shell is typically resilient and has a radius smaller than the candle. The inner shell includes a substantially cylindrical portion having a longitudinal axis. The inner shell further includes a number of prongs sharing a common longitudinal axis with the substantially cylindrical portion. The end of the outer shell that is adapted to connect to the candelabra is a closed end with a hole adapted to receive a screw, bolt or other device used to attached the support apparatus to the candelabra. The inner and outer shells are connected to each other by a connecting device such as a rivet that is typically driven through both the inner and outer shell perpendicular to the longitudinal axis.

Applicant believes that another related reference corresponds to U.S. Pat. No. D427,338 issued for a Candle holder.

Applicant believes that another related reference corresponds to U.S. Pat. No. 5,975,889 issued for a Candle support apparatus. The “889” reference, discloses a candle support apparatus which is adapted for securement to a bottle cap, package, container or other gift, comprising a candle socket, and at least two elongated, resilient arms radially extending from the candle socket. The resilient arms have depending arm portions with an inclined tab inwardly disposed at the distal end of each depending arm, to secure the candle support apparatus about an unopened bottle cap secured to a bottle. A suitable adhesive is positioned beneath the candle socket to provide additional means of securement. A detent is provided for ease of breaking the resilient arms from the candle socket, to enable the user to alternately secure the candle support apparatus to a suitable object, such as a package, jar, can, container or other gift. A drip catching disc may be secured beneath the candle socket to catch drips from the lighted candle. The drip catching disc preferably has a raised outer periphery for ease of retaining candle drips.

The core concept of the multi-tiered adjustable candle holder assembly is known, but the additional disclosures around the lamp, switch, covers, and securing mechanism differentiate the claimed invention from the prior art.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a candle holder structure in which the multiple holder assemblies along the central rod offer a versatile and decorative design, allowing users to arrange and display candles in an aesthetically pleasing manner. This feature enhances the visual appeal of the candle holder, making it suitable for various settings and decor styles.

It is another object of this invention to provide a candle holder structure in which the arrangement of multiple holder assemblies, allows the invention for efficient placement of candles. Users can place candles at different heights and positions along the central rod, creating an attractive and dynamic display.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
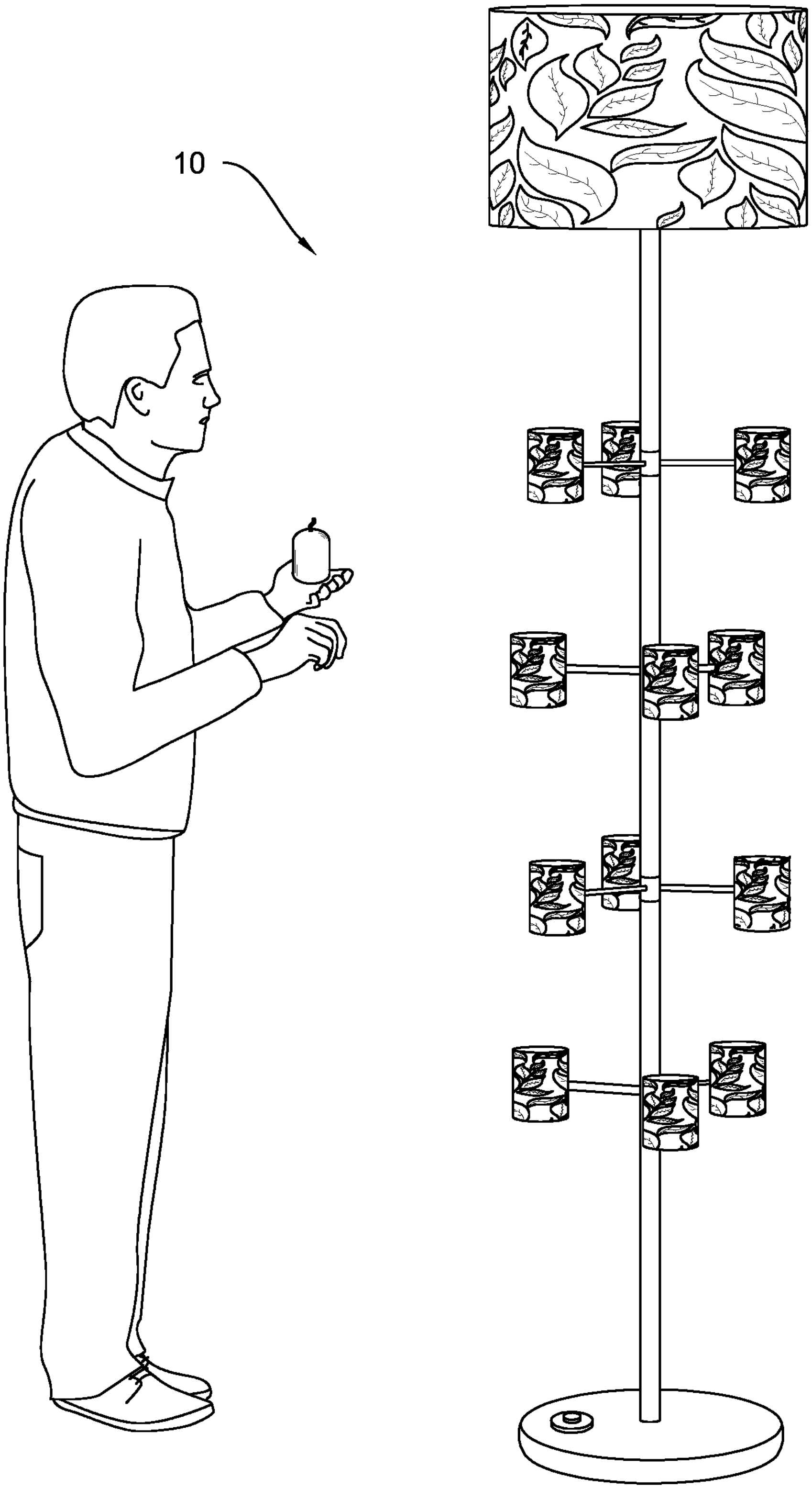
FIG. 1 represents an operational view of the present invention 10 according to one exemplary embodiment.

Referring now to the drawings, where the present invention is generally referred to with numeral 10, it can be observed that it basically includes a body assembly 20 and a holder assembly 40. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The body assembly 20 includes a central rod 22 connected to a base 24 and including a lampshade 26 at a top distal end, opposite to the base 24. The body assembly 20 may be made of a sturdy, lightweight, rigid, and/or durable material. Depending on operational and manufacturing requirements, the body assembly 20 may be made of metal, wood, polymers, ceramics, natural or synthetic fibers, or any other suitable material as known in the art. it is worth mentioning that the aforementioned materials are listed for explanatory purposes and not in a limiting sense. The central rod 22 may be the element that receives the holder assembly 40 along its longitudinal section. In one embodiment, the central rod 22 may have a cylindrical shape. However, other suitable geometries may be used without departing from the scope of the present invention 10. In one embodiment, the central rod 22 may be manufactured in a continuous length and cut to the desired length and size for the intended application. In one embodiment, the base 24 and the central rod 22 may be a monolithic piece. In another embodiment, the base 24 may be attached to the bottommost distal end of the central rod 22 using attaching means as known in the art. In one embodiment, the base 24 may have a circular geometry wherein the central rod 22 may extend from a central portion of the base 24 as appreciated in FIG. 1-2. In other embodiments, the geometry of the base may vary as long as it provides a stable foundation for the present invention 10, ensuring that it remains upright, secure, and that it supports the weight of the central rod 22, shade 26 and holder assembly 40. The lampshade 26 may be disposed at the top part of the central rod 22. The lampshade 26 may cover and diffuse the light emitted by the light source 27. Lampshade 26 may come in various shapes and materials. In one embodiment, the lampshade 26 may exhibit predetermined patterns 29. Connected to the base 24 the present invention 10 may include a power cord 28 to provide electrical connectivity between the present invention 10 and a power source. Additionally, the present invention 10 may further be equipped with a foot switch 28*a* electrically connected to the power cord 28 to offer a convenient and hands-free method for users to control the lamp's operation. The foot switch 28*a* may be a pedal located on the base 24 that can be pressed with the user's foot.

Figure 2:
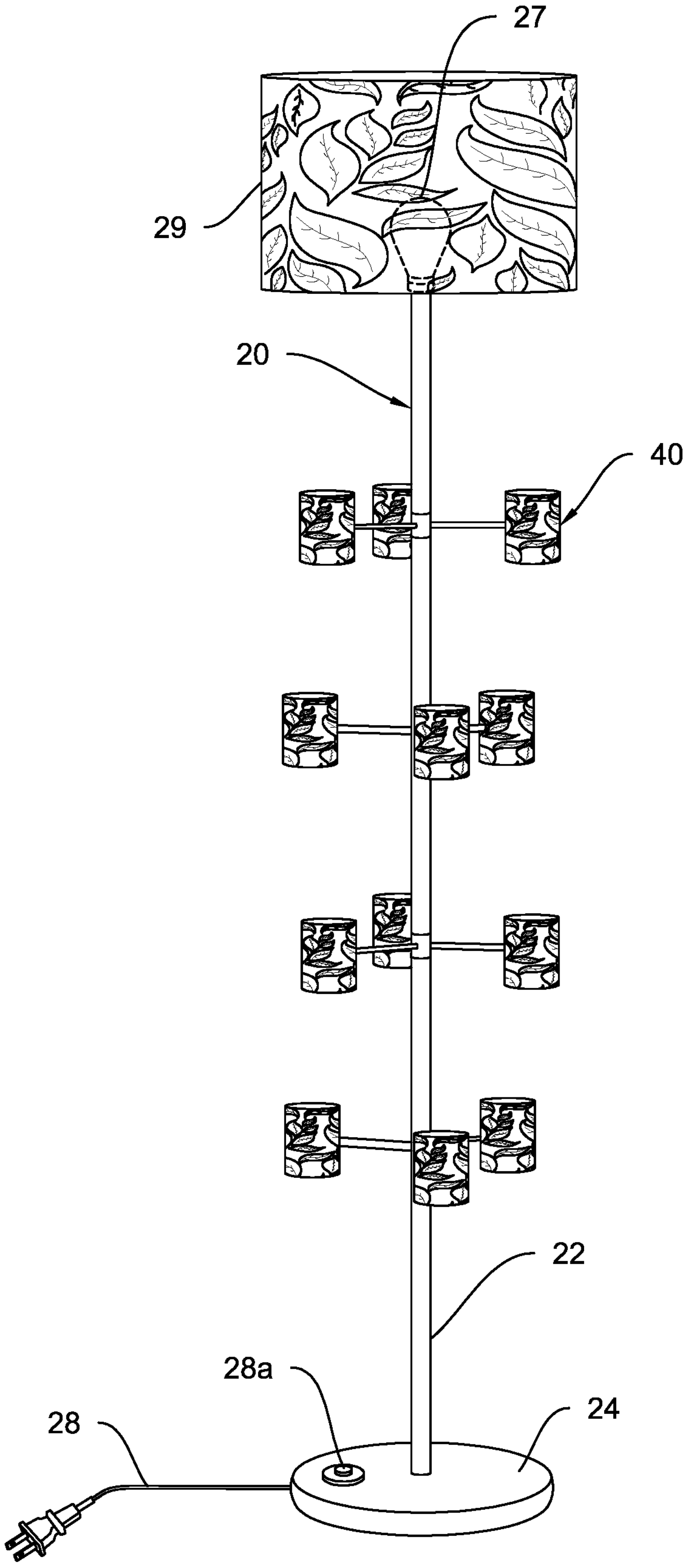
FIG. 2 shows an isometric internal view of the present invention according to one exemplary embodiment.
Figure 3:
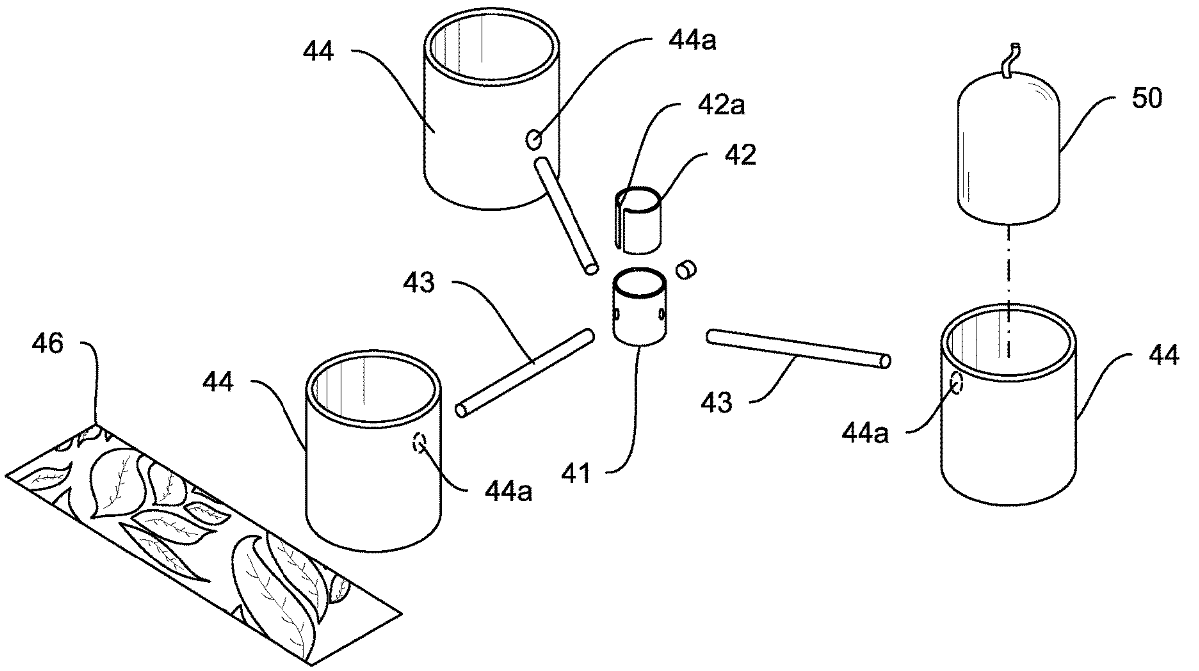
FIG. 3 illustrates a disassembled perspective view of the present invention according to one embodiment.

The holder assembly 40 may include a central holder 41, a stopper 42, holder rods 43 and candle holders 44. As depicted in FIG. 2, the central holder 41 may be received by the central rod 22. The central holder 41 may feature a geometry that commensurate with the geometry of the central rod 22. In one embodiment, the central holder 41 may have a cylindrical shape, and may have a central opening that longitudinally traverse it, wherein the central rod 22 may be inserted. In one embodiment, the stopper 42 may be received inside the central holder 41 to tight fit the central holder 41 onto the central rod 22. In one embodiment, the stopper 42 may have a smaller diameter than the central holder 41 to fit therein. Additionally, the stopper 42 may feature a slot 42*a* along its length. The slot 42*a* provides flexibility to the stopper material, making it easier to compress or expand during insertion or removal. The central holder 41 may exhibit central holder openings 41*a* about its periphery, wherein the openings 41*a* may be disposed along a same plane relative to a cross section of the central holder 41. In a preferred embodiment, the central holder 41, may have three aligned openings to receive the holder rods 43. Nevertheless, the number of central holder openings 41*a* may vary depending on operation or manufacturing requirements. The holder rods 43 may be elongated members that are inserted into the central holder openings 41*a*. Therefore, the holder rods 43 may be dimensioned to fit therein. Each of the candle holders 44 may have an open top receptacle dimensioned to receive a candle 50 therein. In one embodiment, each candle holder 44 may have a cylindrical shape. In alternative embodiments, each candle holder 44 may have any other suitable volumetric geometry. Each candle holder 44 may be made of glass, metal, ceramic, porcelain, wood, stone, or any other suitable material as known in the art. Additionally, a cover 46 dimensioned to enclose the lateral wall of each candle holder may be used. Wherein the cover 46 may exhibit predetermined patterns that may match with the pattern 29 of the lampshade 26. Each candle holder may exhibit a candle holder opening 44*a* to receive a distal end of each holder rod therein, thereby securing and supporting the candle holders 44 around the central holder 41 as depicted in FIG. 1-2. When central holder 41, the stopper 42, the holder rods 43 and candle holders 44 are assembled as described above, they define a tier of candle holders. As can be appreciated in FIG. 1-2, several tiers of candle holders can be mounted along the central rod 22. In a preferred embodiment, the present invention 10, may exhibit 4 tiers of candle holders. However, the number of tiers mounted to the central rod 22 may vary depending on operational requirements.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A candle holder structure, comprising:

a. a body assembly including a central rod attached to a central portion of a base;

wherein the body assembly further includes a lampshade disposed at a top distal end of the central rod configured to cover and diffuse light emitted by a light source electrically connected thereto;

b. a holder assembly including:

a central holder dimensioned to be received by the central rod, wherein the central holder features openings disposed on its lateral wall, defining central holder openings;

a candle holder having an open top configured to receive a candle therein, wherein the candle holder has a candle holder opening on its lateral wall;

a holder rod that links the candle holder to the central holder, wherein one distal end of the holder rod is received by one of the central holder openings and the opposite distal end of the holder rod is received by the candle holder through the candle holder opening;

c. wherein multiple holder assemblies are disposed and adjusted along the central rod.

2. The candle holder structure of claim 1, wherein the lampshade features a shade cover pattern.

3. The candle holder structure of claim 1, wherein the body assembly further includes a power cord connected to the base.

4. The candle holder structure of claim 3, wherein a foot switch located along the power cord.

5. The candle holder structure of claim 1, wherein the holder assembly further includes a stopper featuring a slot, wherein the stopper is received by the central holder; the stopper is configured to tightly secure the central holder onto the central rod.

6. The candle holder structure of claim 1, wherein the holder assembly includes a cover dimensioned to enclose the lateral wall of the candle holder.

7. The candle holder structure of claim 6, wherein the cover exhibits a predetermined pattern.

8. The candle holder structure of claim 1, wherein the candle holders are secured in a circular arrangement around the central holder.

9. A candle holder structure, comprising:

a body assembly including a central rod attached to a central portion of a base, a lampshade attached to a top distal end of the central rod to cover light emitted by a light source, the base has a power cord with a foot switch to actuate the light source;

a holder assembly including:

a central holder dimensioned to be received by the central rod and secured thereto by means of a stopper, wherein the central holder features openings disposed on its lateral wall, defining central holder openings;

a candle holder having an open top to receive a candle therein, wherein the candle holder has a candle holder opening on its lateral wall;

a holder rod that links the candle holder to the central holder, wherein one distal end of the holder rod is received by one of the central holder openings and the opposite distal end of the holder rod is received by the candle holder through the candle holder opening;

wherein the number of candle holders attached to the central holder is equal to the number of central holder openings;

wherein multiple holder assemblies are disposed along the central rod.

10. The candle holder structure of claim 1, wherein the lateral wall of the candle holder is enclosed by a cover.

* * * * *